United States Patent [19]

Berger et al.

[11] Patent Number: 5,016,587

[45] Date of Patent: May 21, 1991

[54] BRAKE STOP LIGHT CIRCUIT ARRANGEMENT FOR A VEHICLE HAVING ELECTRONIC DIESEL CONTROL

[75] Inventors: Joachim Berger, Winterbach; Ulrich Gerstung, Vaihingen/Enz, both of Fed. Rep. of Germany

[73] Assignee: Robert Bosch GmbH, Stuttgart, Fed. Rep. of Germany

[21] Appl. No.: 452,399

[22] Filed: Dec. 19, 1989

Related U.S. Application Data

[63] Continuation-in-part of Ser. No. 330, Apr. 19, 1988.

[51] Int. Cl.$^5$ .................. F02D 41/38; F02D 41/22; B60Q 1/44
[52] U.S. Cl. .................................. 123/359; 123/198 D
[58] Field of Search .................. 123/198 D, 352, 357, 123/359

[56] References Cited

U.S. PATENT DOCUMENTS 4,515,125  5/1985  Buck et al. .......................... 123/359
4,791,900 12/1988  Buck et al. .......................... 123/359

Primary Examiner—Tony M. Argenbright
Attorney, Agent, or Firm—Walter Ottesen

[57] ABSTRACT

The invention is directed to a brake light switch circuit arrangement having an additional switch $S_2$ which opens upon actuation of the brake pedal 13 but only after a first switch $S_1$ closes. The signals from the two switches are processed by a gating circuit (16, 17, 18) to produce brake signals ($B_{S1}$ and $B_{S2}$) which are to provide a standby idle-running idle-setting signal (LL*) and switch off a driving-speed controller (FGR) via the main computer (30) of the electronic diesel control. In the event that the brake switch $S_1$ becomes defective and remains closed while overtaking another vehicle, the condition is prevented that the EDC does not reduce the injected fuel quantity to the idling quantity, even though the accelerator pedal is depressed. It is also prevented that, in the event of a fault in the brake switch ($S_1$) while the accelerator pedal is released, constant vehicle velocity control by the EDC is not switched off.

5 Claims, 1 Drawing Sheet

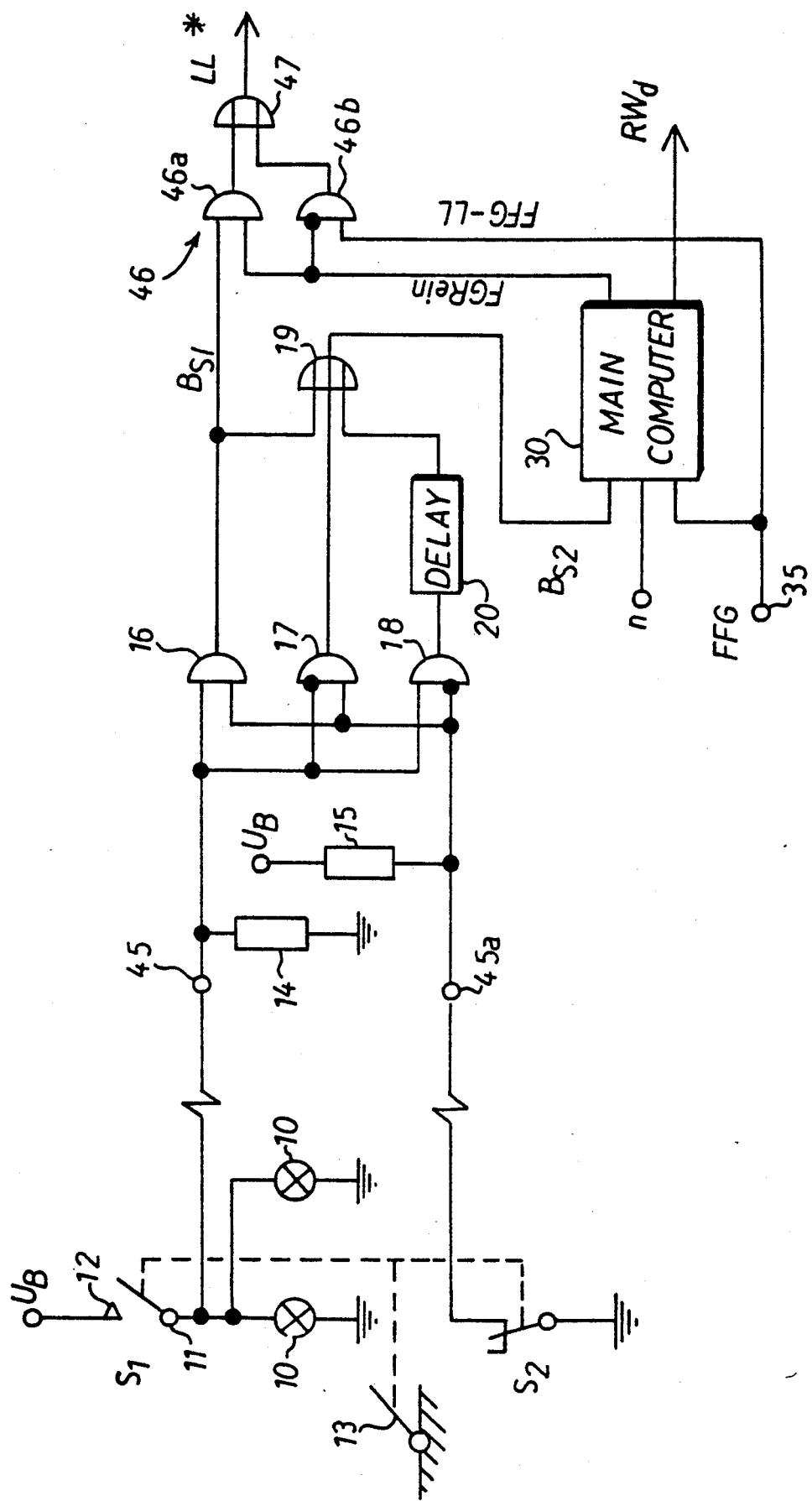

BRAKE STOP LIGHT CIRCUIT ARRANGEMENT FOR A VEHICLE HAVING ELECTRONIC DIESEL CONTROL

RELATED APPLICATION

This application is a continuation-in-part application of our international patent application PCT/EP88/00330 filed on Apr. 19, 1988.

FIELD OF THE INVENTION

The invention relates to a brake stop light circuit arrangement for a vehicle equipped with a diesel engine having electronic diesel control (EDC).

BACKGROUND OF THE INVENTION

A safety and emergency driving method and an arrangement for performing the method is described in U.S. Pat. No. 4,791,900, and this application is incorporated herein by reference.

As described in U.S. Pat. No. 4,791,900, the brake light signal, that is, the switching on and off of the brake lights upon depression of the brake pedal, is processed in the safety system as an additional or standby signal indicating idling control, that is, a reduction of the injected fuel quantity to the idling quantity for the purpose of using the engine as a brake.

In the event of a fault such that an idle running signal FFR-LL is not produced when the accelerator pedal is completely released, a too-large an injected fuel quantity can be switched off by actuating the brakes. However, this brings with it the danger that, in the event of the brake light switch being defective in that it remains closed, it can lead to a reduction of the injected fuel quantity in critical driving situations, for example, during passing another vehicle. Also, upon actuation of the brakes and operation of the diagnosis switch of the fault memory in the EDC, fault diagnosis and removal of the fault become more difficult.

U.S. Pat. No. 4,791,900 discloses a safety arrangement wherein is detected when, in the presence of a redundant idle signal LL*, the control rod assumes a position which does not correspond to its idle position. In this case, an emergency operation is initiated. A system having a driving-speed controller FGR and a braking signal are applied to form the redundant idle-running signal. In addition, the driving-speed controller must be switched off in the presence of a brake signal.

With such an arrangement, the situation can develop that the brake switch malfunctions, that is, the switch issues a braking signal which indicates a non-actuated brake pedal even though the brake is actuated or it indicates an actuation of the brake pedal even though the brake is not actuated. In this way, the situation can develop that the driving-speed controller FGR is not switched off when the brake is actuated. This condition is to be prevented. Furthermore, an emergency driving program can under some circumstances be activated wherein there is a reduction of the quantity of fuel even though the preconditions for this condition are not present.

SUMMARY OF THE INVENTION

It is an object of the invention to provide a brake stop light circuit arrangement which provides a solution for the problem delineated above.

In the case of a vehicle whose EDC has provision for the vehicle to be driven automatically at constant driving speed, irrespective of the position of the accelerator pedal, also as described in the above-mentioned U.S. Pat. No. 4,791,900 the driving-speed control (FGR) is switched off upon actuation of the brake pedal. However, should the brake light switch be defective in that it does not close, the driving-speed controller FGR does not react, which can frighten the driver and lead to a critical situation.

There may be occasions when both the accelerator and brake pedals are depressed simultaneously, and faulty operation of the safety system under such circumstances can be avoided.

BRIEF DESCRIPTION OF THE DRAWING

The invention is further described with reference to the drawing which is a circuit block diagram of a brake stop light circuit arrangement for a vehicle having EDC and of related components of the EDC.

DESCRIPTION OF THE PREFERRED EMBODIMENT

The usual brake lights 10 are connected between one pole 11 of a brake light switch $S_1$, and ground, the other pole 12 of the switch $S_1$ being connected to a battery terminal $U_B$. The pole 12 is also connected to a terminal 45 of the EDC, of which only the pertinent components, including a main computer 30, are shown in the drawing. Other details of the EDC can be obtained from the above-mentioned U.S. Pat. No. 4,791,900.

The main computer 30 receives various input variables and delivers various output variables. One input variable is the position of the accelerator pedal. A pedal position transducer is connected to a terminal 35 and thereby delivers a pedal position signal FFG to the main computer 30. Included in the signal FFG is a distinct signal FFG-LL indicating that the accelerator pedal is completely released, that is, in the idling position. The main computer 30 receives an engine speed signal (n) and a brake signal $B_{S2}$, the latter indicating that the brakes are operated. The main computer 30 delivers a desired value signal $RW_d$, indicating the desired injected fuel quantity, that is, the desired delivery setting of the injection pump (not shown). The main computer 30 also delivers a signal FGRein, indicative that driving speed control (FGR) is in operation.

In accordance with the invention, the brake stop light circuit arrangement further includes a second switch $S_2$ which is independent of the brake lights 10 and which is shown as being connected between ground and a separate terminal 45a of the EDC. Whereas the switch $S_1$ is normally open and is closed upon depression of the brake pedal 13, the second switch $S_2$ is shown as being normally closed and is opened upon depression of the brake pedal 16. Furthermore, to avoid ambiguity, it is ensured that the pedal travel required to open the switch $S_2$ is slightly greater than that required to close the switch $S_1$. The terminal 45 is connected via a high resistance 14 to ground and the terminal 45a is connected via a high resistance 15 to the battery terminal $U_B$. Each switch thereby delivers a 0 signal to the terminal corresponding thereto when the brake pedal is released and a 1 signal when the brake pedal is operated. However, when the brakes are very lightly operated, the switches $S_1$ and $S_2$ could deliver, respectively, a 1 signal and a 0 signal.

The various possibilities for normal operation and the occurrence of faults can be tabulated as delineated below.

| Switch State | | | |
|---|---|---|---|
| $S_1$ | $S_2$ | Indications | Consequences |
| 0 | 0 | Brakes not operated | FGR possible<br>No safety operation |
| 0 | 1 | Fault in brake light circuit | FGR not possible<br>No safety operation |
| 1 | 0 | (Transient state possible) See below for fault indication | FGR not possible<br>No safety operation |
| 1 | 1 | Brakes operated | FGR not possible<br>Safety operation if FFG > 0 |

To achieve the above operation, the terminals 45, 45a are connected to gating circuits as described below.

Both terminals are connected to non-inverting inputs of an AND gate 16 whose output brake signal $B_{S1}$ is applied to a gating circuit 46 where it is combined with the signal FGRein from the main computer 30 and the signal FFG-LL from the accelerator pedal transducer to produce the standby idle-running signal LL*. The terminal 45 is also connected to inverting and non-inverting inputs, respectively, of AND gates 17, 18 and the terminal 45a is connected to non-inverting and inverting inputs, respectively, of the AND gates 17, 18. In addition, the outputs of the AND gates (16, 17) are connected directly to an OR gate 19 and the output of the AND gate 18 is connected via a delay circuit 20 to the OR gate 19.

It is possible for the second switch $S_2$ to be connected to the battery voltage $U_B$, instead of to ground. It is also possible for the second switch $S_2$ to be a normally-open switch instead of a normally closed switch. Such changes would require alternating the connections of the resistor 15 and the inputs to the gates (16, 17, 18).

The brake signal $B_{S1}$ and the driving-speed control "on" signal FGRein are applied to respective inputs of an AND gate 46a to produce a standby idle-running signal LL* via an OR gate 47 in the event that the brakes are actuated while the driving-speed control is switched on. The signals FGRein and FFG-LL are applied, respectively, to inverting and non-inverting inputs of an AND gate 46b to produce the idle-running signal LL* via the OR gate 47 in the event of failure of the accelerator pedal transducer, or at least that part adapted to produce the signal FFG-LL when the pedal is in its fully raised position. These possibilities and the processing of the standby idle-running signal LL* are described more fully in the above-mentioned U.S. Pat. No. 4,791,900.

It can be seen that the brake signals $B_{S1}$ and $B_{S2}$ are produced and processed in accordance with the above table. The delay produced by the delay circuit is of the order of 20 seconds which is longer than the period for which there is any likelihood of the brake pedals being held continuously but only lightly depressed. The second condition, $S_1=0$, $S_2=1$ can only occur when the brake switch $S_1$ is defective and this can be indicated by the fault diagnosis. The third condition $S_1=1$, $S_2=0$ takes place at least momentarily each time the brake is operated and continues during light braking. It is therefore a permissible condition and is not to be taken as indicating a fault unless it lasts too long, that is, over 20 seconds. The likelihood of a fault occurring during this 20 second period is remote. If the switching sequence becomes irregular, both of the second and third conditions can occur. Once the 20 second delay has elapsed, a fault is indicated. A fault is also indicated if the third condition $S_1=1$, $S_2=0$ lasts for more than 20 seconds.

Thus, the problem described above with respect to the arrangement disclosed in U.S. Pat. No. 4,791,900 is solved by providing two brake switches. The first brake switch $S_1$ is a contactor assigned to the brake pedal and which also functions to supply the stop lights 10. The second switch $S_2$ is arranged separately from the first switch $S_1$ and is fully independent thereof.

A defect of one of the switches can be detected by evaluating the signals of both brake switches. If one switch shows that the brake is actuated and the other shows that the brake is not actuated, a defect of one of the switches is indicated as shown in the table presented above.

According to a feature of the invention, the second switch responds only after a delay.

If at least one of the switches indicates an actuation of the brake, then the driving-speed controller FGR is switched off by the signal $B_{S2}$. In this way, the assurance is provided that the driving-speed controller will in each instance be switched off when the brake is actuated. More specifically and as shown in the drawing, the brake light switch $S_1$ is connected to the main computer 30 for automatically switching off the driving-speed controller FGR upon actuation of the foot brake pedal 13. The gate circuit (16, 17, 18) connects both switches ($S_1$, $S_2$) to the main computer 30 so that the driving-speed controller FGR is switched off upon actuation of the brake even if one switch is defective. However, the driving-speed controller is not switched off in the absence of brake actuation even if one switch is defective.

The brake signal $B_{S1}$ is formed for determining the redundant idle-running signal LL* only when both switches indicate an actuated brake. Thus, as discussed above, both terminals are connected to non-inverting inputs of an AND gate 16 having an output brake signal $B_{S1}$ applied to a further gating circuit 46 where it is combined with the signal FGRein from the main computer 30 and the signal FFG-LL from the accelerator pedal transducer to produce the standby idle-running signal LL*.

By providing two brake switches, an erroneous reaction of the safety and emergency driving arrangement according to U.S. Pat. No. 4,791,900 is avoided.

The invention can be realized by suitable software or hardware. The standby signal is also monitored and it is used only during emergency operation of the EDC. The system safety is improved by the invention.

It is understood that the foregoing description is that of the preferred embodiments of the invention and that various changes and modifications may be made thereto without departing from the spirit and scope of the invention as defined in the appended claims.

What is claimed is:

1. A brake stop light circuit arrangement for a motor vehicle equipped with a diesel engine having electronic diesel control with a driving-speed controller (FGR), the circuit arrangement comprising:

a first brake switch actuated by the brake pedal of the vehicle for supplying a first brake switch signal;

a second brake switch also actuated by the brake pedal for supplying a second brake switch signal, said second brake switch being electrically independent of said first brake switch;

first circuit means for receiving and evaluating said first and second brake switch signals for issuing a first actuating signal $B_{S2}$ for switching off the driving-speed controller (FGR) when either one of said brake signals indicates an actuation of the brake; and, second circuit means for receiving and evaluating said first and second brake switch signals for issuing a second actuating signal $B_{S1}$ for determining a redundant idle speed signal $LL_*^*$.

2. The arrangement of claim 1, said first and second circuit means including delay means for delaying the formation of said first actuating signal $B_{S2}$ thereby preventing a defect from being diagnosed in the event of a short period of light actuation of the brake.

3. The arrangement of claim 1, said first and second circuit means including a gating circuit (16) connected to said brake switches to enable said redundant idle speed signal $LL^*$ to be produced when neither of said brake switches is defective or when said first brake switch is defective in that it remains closed when the brake is released.

4. The arrangement of claim 3, wherein the electronic diesel control includes a main computer, and said first and second circuit means including a gating circuit (16, 17, 18) for connecting said brake switches to said main computer so as to switch off said driving-speed controller (FGR) upon actuation of the brake even if one of said brake switches is defective and yet not actuating said driving speed controller (FGR) when the brake is actuated even if one of said brake switches is defective.

5. The arrangement of claim 4, said second brake switch being closed when the brake pedal is released and opening upon operation of the brake pedal, but only after said first brake switch has closed.

* * * * *

UNITED STATES PATENT AND TRADEMARK OFFICE
CERTIFICATE OF CORRECTION

PATENT NO. : 5,016,587
DATED : May 21, 1991
INVENTOR(S) : Joachim Berger and Ulrich Gerstung It is certified that error appears in the above-identified patent and that said Letters Patent is hereby corrected as shown below:

On the title page, under "Related U.S. application Data", reference numeral [63]: delete "Ser. No. 330" and substitute -- International patent application PCT/EP88/00330 -- therefor.

In column 1, line 41, between "wherein" and "is" insert -- an error --.

In column 2, line 40: delete "," and substitute -- . -- therefor.

In column 5, line 10, between "LL" and "*", delete ",".

Signed and Sealed this

Twenty-fifth Day of May, 1993

Attest:

*Attesting Officer*

MICHAEL K. KIRK

*Acting Commissioner of Patents and Trademarks*